(12) United States Patent
Mau et al.

(10) Patent No.: US 8,096,513 B2
(45) Date of Patent: Jan. 17, 2012

(54) AERODYNAMIC FLAP OF AN AIRCRAFT HAVING A DEVICE WHICH INFLUENCES THE FLAP VORTEX

(75) Inventors: Knut Mau, Hamburg (DE); Michael Grünewald, Höhenkirchen (DE); Johann Reichenberger, Ainring (DE); Ingo Borchers, Uhldingen-Mühlhofen (DE); Roger Drobietz, Salem (DE)

(73) Assignee: Airbus Operations GmbH, Hamburg (DE)

( * ) Notice: Subject to any disclaimer, the term of this patent is extended or adjusted under 35 U.S.C. 154(b) by 689 days.

(21) Appl. No.: 12/280,121

(22) PCT Filed: Feb. 23, 2007

(86) PCT No.: PCT/DE2007/000346
§ 371 (c)(1),
(2), (4) Date: Sep. 25, 2008

(87) PCT Pub. No.: WO2007/095931
PCT Pub. Date: Aug. 30, 2007

(65) Prior Publication Data
US 2009/0084905 A1    Apr. 2, 2009

(30) Foreign Application Priority Data

Feb. 23, 2006    (DE) .......................... 10 2006 008 434

(51) Int. Cl.
*B64C 23/06* (2006.01)
(52) U.S. Cl. .................. 244/199.2; 244/199.4; 244/207; 244/212

(58) Field of Classification Search .................. 244/198, 244/199.1, 199.2, 199.4, 207, 212
See application file for complete search history.

(56) References Cited

U.S. PATENT DOCUMENTS

| | | | |
|---|---|---|---|
| 3,596,854 A | | 8/1971 | Haney, Jr. |
| 4,671,473 A | * | 6/1987 | Goodson .................... 244/199.4 |
| 5,158,251 A | * | 10/1992 | Taylor ........................ 244/199.3 |
| 5,562,414 A | | 10/1996 | Azuma |
| 5,823,480 A | * | 10/1998 | La Roche ................... 244/199.4 |
| 6,283,406 B1 | | 9/2001 | Remington |
| 6,467,732 B2 | * | 10/2002 | Tsukahara et al. ......... 244/199.4 |
| 6,491,260 B2 | | 12/2002 | Borchers |
| 6,948,906 B2 | * | 9/2005 | Leishman et al. ............ 415/119 |
| 7,637,462 B2 | * | 12/2009 | Pal ............................. 244/199.2 |
| 7,661,629 B2 | * | 2/2010 | Shmilovich et al. ....... 244/199.2 |
| 2001/0032907 A1 | | 10/2001 | Borchers |
| 2004/0197194 A1 | * | 10/2004 | Leishman et al. ............ 416/232 |
| 2007/0262205 A1 | * | 11/2007 | Grant ......................... 244/199.2 |
| 2008/0035789 A1 | * | 2/2008 | Lewis et al. .................... 244/1 R |

FOREIGN PATENT DOCUMENTS

| | | |
|---|---|---|
| DE | 10020177 A1 | 11/2001 |
| EP | 0689990 A1 | 1/1996 |

(Continued)

OTHER PUBLICATIONS

First Office Action and English Translation for corresponding Chinese national stage of PCT Application No. PCT/DE2007/000346, May 6, 2010.

(Continued)

*Primary Examiner* — David H Bollinger
(74) *Attorney, Agent, or Firm* — Matthew B. Dernier, Esq.; Gibson & Dernier LLP

(57) ABSTRACT

A high-lift flap of an aircraft is provided having a device for influencing the flap vortex as well as a device for influencing the flap vortex at the lateral edge of the aerodynamic high-lift flap, which can be achieved effectively and at low cost.

17 Claims, 6 Drawing Sheets

FOREIGN PATENT DOCUMENTS

| | | | |
|---|---|---|---|
| EP | 1149761 | A1 | 10/2001 |
| LU | 34999 | A | 9/1958 |
| WO | 00/02775 | A | 1/2000 |

OTHER PUBLICATIONS

International Search Report form PCT/210 for PCT/DE2007/00346.

* cited by examiner

AERODYNAMIC FLAP OF AN AIRCRAFT HAVING A DEVICE WHICH INFLUENCES THE FLAP VORTEX

FIELD OF THE INVENTION

The invention relates to an aerodynamic flap of an aircraft and in particular a high-lift flap of an aircraft having a device for influencing the flap vortex or having a vortex generator as well as a device for influencing the flap vortex.

BACKGROUND

Known from WO 00/02775 A is a high-lift flap on a wing for large aircraft which has jags extending in the direction of flow in order to reduce the vortex trail of the wing.

EP 1 149 761 A1 describes vortex generators which are configured as elongated elements on a profile surface of a control surface.

U.S. Pat. No. 6,283,406 B1 discloses a rotor blade for helicopters which, for influencing vortex, has air intake passages for admitting air on a first longitudinal side and air output passages for expelling air on a second longitudinal side located opposite to said first longitudinal side.

EP 0 689 990 A1 describes a rotor blade for helicopters which has outlet openings and a device for ejecting air through these outlet openings.

Modern passenger aircraft use so-called high-lift aids during the takeoff and landing phase to produce the necessary lift at low speeds. Along with the landing gear, these aircraft components, divided into leading-edge flaps and landing flaps, are the main generators of aerodynamic noise in passenger aircraft. During the landing approach when the engines are strongly throttled, this noise can reach the same order of magnitude as that of the engines.

Comprehensive research programmes, both in the USA and in Europe, have shown that substantially two source regions on the high-lift aids are responsible for generating this noise: the rear side of the leading-edge flap and the lateral edge of the landing flap. The generation of the noise in the last-mentioned source region can be attributed to the lateral edge vortex produced by the flow around the lateral edge. This flow is caused by the pressure difference between the upper and lower side of the landing flap. As a result of the relatively high deflection angle of the landing flap, vortex shedding takes place both at the upper and at the lower edge of the lateral surface, and these combine to form a large vortex after a certain running length. The interaction of this vortex with the surface of the landing flap then leads to the formation of noise.

A device for reducing the aerodynamically induced noise at the lateral edge of a control flap, in particular of a high-lift flap of an aircraft is known from DE 100 20 177 A1, wherein a vortex generator is formed by a number of elements extending in the wing span direction on the lateral edge of the control flap, between which air flowing past the control flaps flows. The elements extending in the wing span direction are configured as elongated and are provided in the form of brush-like arrangements which run over one or more sections of the profile depth of the control flap.

Also known from U.S. Pat. No. 3,596,854 is a vortex generator which comprises a tubular element running along the lateral edge of the control flap having an orifice which opens towards the rear side of the control flap through which the compressed air collected on the overpressure side of the high-lift flap is released. The direction of rotation of the vortex can be selected in the sense of an enlargement or a reduction in the lift force of the high-lift flap.

SUMMARY OF THE INVENTION

The object of the invention is to provide an aerodynamic flap of an aircraft and in particular a high-lift flap of an aircraft having a device for influencing the flap vortex as well as a device for influencing the flap vortex at the lateral edge of the aerodynamic high-lift flap, which can be achieved effectively and at low cost.

According to one aspect of the invention, an aerodynamic flap of an aircraft and in particular a high-lift flap of an aircraft is provided, comprising a device which influences the flap vortex on at least one lateral edge of the aerodynamic flap which comprises elements extending transversely to the direction of flow of the air along which the air flowing around the aerodynamic flap flows. The elements extending transversely to the direction of flow of the air are flap portions of the aerodynamic flap configured on the lateral edge of the aerodynamic flap, wherein one or more air passages are located between these flap portions for the through-flow of air flowing onto the aerodynamic flap.

The flap portions of the aerodynamic flap extending transversely to the direction of flow of the air are disposed fixedly or rotationally fixedly on the control flap or are formed in one piece with said flap, and air passage for the through-flow of air flowing onto the aerodynamic flap. In this case, the flap portions extending transversely to the direction of flow of the air can be configured as finger-shaped and project away from at least one lateral edge of the aerodynamic flap. In these embodiments, the number of flap portions extending transversely to the direction of flow of the air can be between three and nine and preferably between three and five.

The flap portions extending transversely to the flow direction of the air comprise at least one flap segment which is movable with respect to the aerodynamic flap, wherein the flap segment is movable in such a manner that during a corresponding movement, it exposes at least one air passage through which the air flowing onto the aerodynamic flap can flow from the underside to the upper side of the aerodynamic flap. At the same time, a mounting integrated structurally with the flap and an adjusting device as well as a coupling device for coupling the adjusting device to the movable flap segment can be provided, by which means during its movement, the flap segment which is movable with respect to the aerodynamic flap can be folded upwards or away from the aerodynamic flap on its upstream side and thereby exposes an air passage for the through-flow of air flowing from the underside of the aerodynamic flap to its upper side. The adjusting device and/or the coupling can each be, but need not necessarily both be integral parts of the aerodynamic flap.

The air passage can be configured in such a manner that this forms a nozzle which accelerates air flowing from the underside of the aerodynamic flap to its upper side.

The flap segment which is movable with respect to the aerodynamic flap can extend over approximately half the profile depth of the aerodynamic flap. Also, the length of the flap segment which is movable with respect to the aerodynamic flap when viewed in the direction of flow of the air is between 30% and 70% of the profile depth or the length of the side edge of the aerodynamic flap.

Furthermore, a coupling mechanism can be provided for coupling the control mechanism of the aerodynamic flap to the control mechanism of the movable flap segment for coupling the movement of the movable flap segment with the movement of the aerodynamic flap.

According to a second aspect of the invention, an aerodynamic flap of an aircraft and in particular, a high-lift flap of an aircraft is provided with a device which influences the flap vortex on at least one lateral edge of the aerodynamic flap, comprising elements which extend transversely to the flow direction of the air, along which the air flowing around the aerodynamic flap flows, wherein the device influencing the flap vortex comprises a large number of elongated elements extending transversely to the flow direction of the air, said elements forming a brush-like arrangement which extends in its length substantially over the entire profile depth of the flap and/or whose length occupies at least 75% of the entire profile depth of the aerodynamic flap.

The elongated elements of the brush-like arrangement can project at an angle and in particular at right angles from the outer contour of the lateral edge of the flap and thereby extend transversely to the flow direction of the air.

The brush-like arrangement can have an outline matched to the profile of the flap. The brush-like arrangement can also have an outline whose profile is matched to the profile of the edge of the aerodynamic flap in the range of the brush-like arrangement.

According to a further aspect of the invention, an aerodynamic flap of an aircraft and in particular, a high-lift flap of an aircraft is provided with a device which influences the flap vortex on at least one lateral edge of the aerodynamic flap, wherein the device influencing the flap vortex comprises at least one device for supplying compressed air and at least one channel which discharges at the lateral edge of the aerodynamic flap and is in communication with the at least one device for supplying compressed air, for expelling compressed air into the surrounding of the aerodynamic flap.

In this case, the discharging channel can discharge in the profile surface of the lateral edge and/or the discharging channel discharges at an angle between 70 and 110 degrees to the contour line of the lateral edge.

The discharging channel can have a connection to the coupling of the aircraft system so that the compressed air expelled through the discharging channel can be supplied from a bleed-air system of the aircraft engines.

Alternatively, the compressed air blown through the discharging channel at the lateral edge of the aerodynamic flap can be produced by dynamic pressure, wherein a connecting device for supplying compressed air is provided at the discharging channel.

In particular, the device which influences the flap vortex comprises at least one channel which discharges into a region of the aerodynamic flap facing the flow and a channel which is in communication with the discharging channel and discharges on the lateral edge of the aerodynamic flap for the through-flow of air from the aerodynamic flap.

According to a further aspect of the invention, a device influencing the flap vortex of an aerodynamic flap and in particular, a high-lift flap of an aircraft is provided, comprising elongated elements extending in one direction for the air flowing from the aerodynamic flap to flow around, wherein the device comprises a connecting device for attaching the device to the flap in such a manner that the elongated elements are configured as flap portions of the aerodynamic flap formed in the lateral edge of the aerodynamic flap, wherein one or more air passages for the through-flow of air flowing from the aerodynamic flap are located between the flap portions.

According to a further aspect of the invention, a device for influencing the flap vortex of an aerodynamic flap and in particular a high-lift flap of an aircraft is provided, wherein the device influencing the flap vortex for expelling compressed air into the surroundings of the aerodynamic flap comprises: at least one device for supplying compressed air and at least one discharging channel for expelling compressed air into the surroundings of the aerodynamic flap which can be attached to the lateral edge of the aerodynamic flap, and a connecting part for connecting the device for supplying compressed air with the discharging channel.

In this case, the discharging channel can be configured in such a manner that this can be disposed in an aerodynamic flap in such a manner that said channel discharges in the profile surface of the lateral edge.

Alternatively or additionally, the discharging channel can be configured in such a manner that this can be disposed in an aerodynamic flap in such a manner that said channel discharges at an angle between 70 and 110 degrees to the contour line of the lateral edge at the discharge point. In this case, the discharging channel can have a connection to the coupling of the aircraft system so that the compressed air expelled through the discharging channel can be supplied from a bleed-air system of the aircraft engines.

Alternatively, the device can have a compressed air supply device through which the compressed air is supplied which can be blown through the channel discharging at the lateral edge of the aerodynamic flap.

The device influencing the flap vortex can comprise at least one intake channel which can be disposed in a region of the aerodynamic flap facing the flow and a discharging channel (outlet channel) which is in communication with the intake channel and can be attached to the lateral edge of the aerodynamic flap for the through-flow of air flowing from the aerodynamic flap.

DETAILED DESCRIPTION OF THE INVENTION

Exemplary embodiments of the invention are explained hereinafter with reference to the drawings. Various solutions are explained hereinafter which in particular reduce the noise emanating from the lateral edge vortex. A driving evaluation factor for the technical obviousness of such modifications to the landing flap is the maximum lift which can be achieved with such a configuration.

Figure 1:
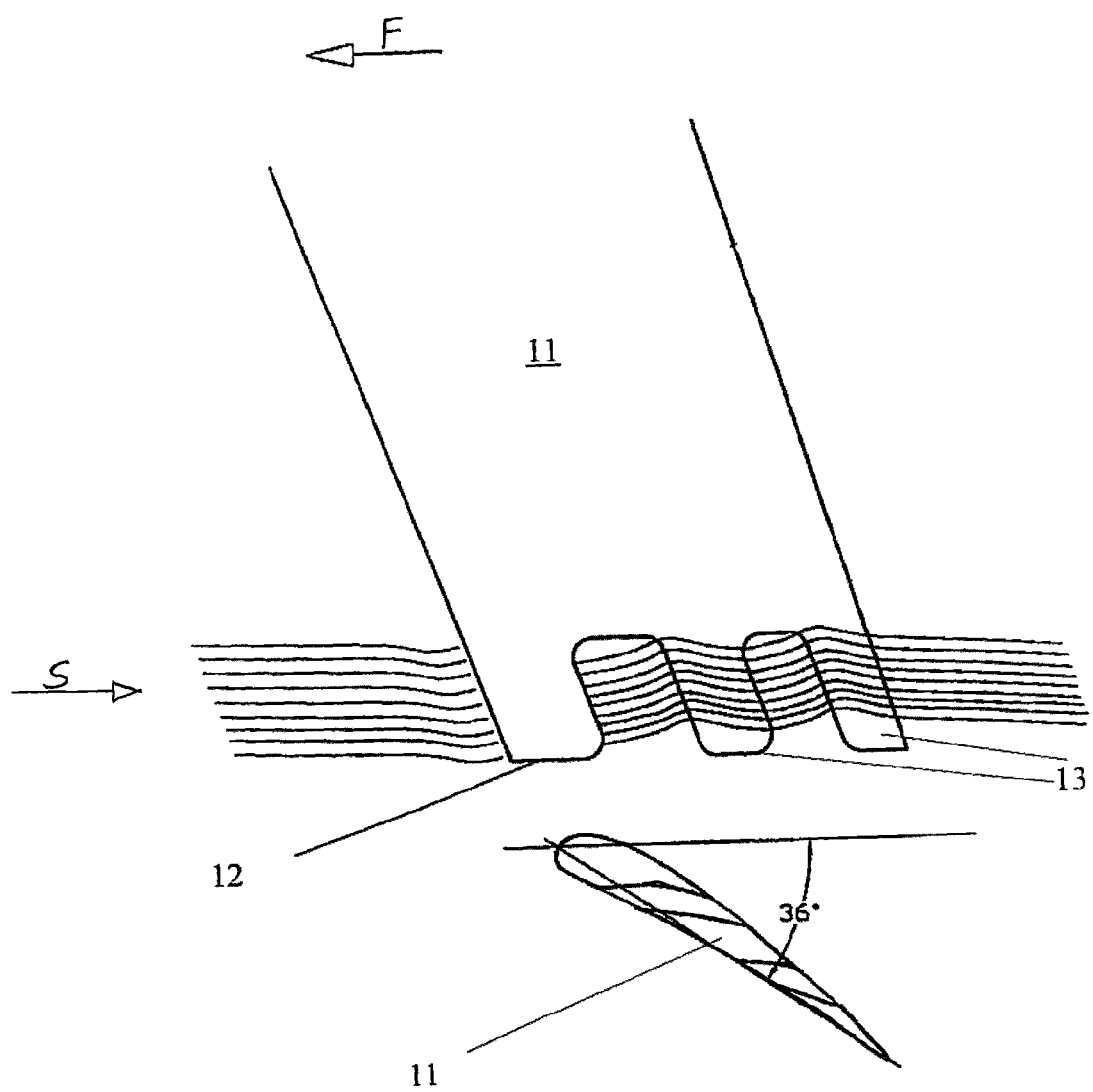
FIG. 1 shows a device for influencing the flap vortex and in particular a device for reducing the aerodynamically induced noise at the lateral edge of a control flap, in particular of a high-lift flap of an aircraft according to a first exemplary embodiment of the invention.
Figure 3:
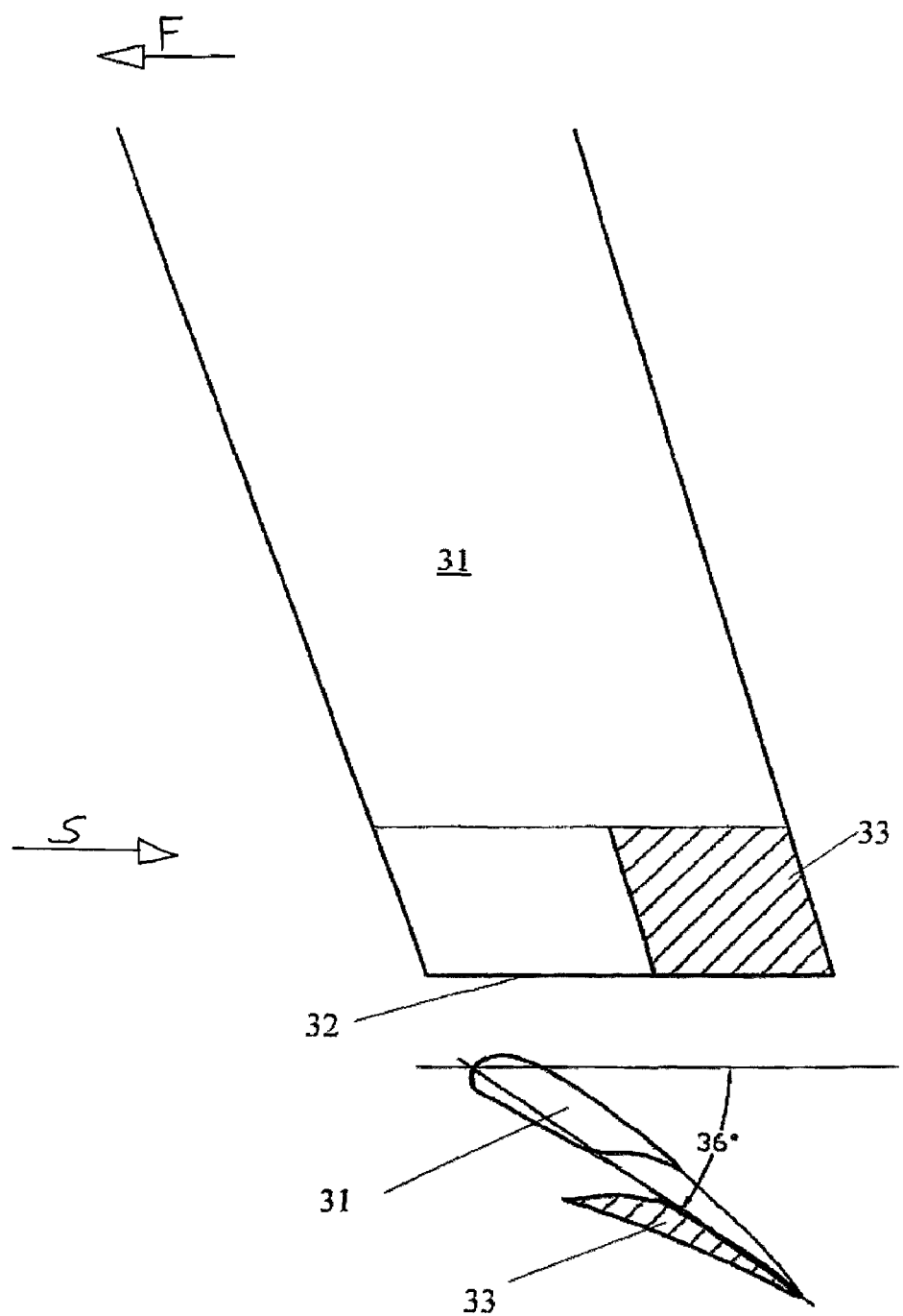
FIG. 3 shows a device for influencing the flap vortex and in particular a device for reducing the aerodynamically induced noise at the lateral edge of a control flap, in particular of a high-lift flap of an aircraft according to a third exemplary embodiment of the invention.

FIGS. 1 and 3 show a device for influencing the flap vortex and in particular a device for reducing the aerodynamically induced noise at the lateral margin or at the lateral edge of a control flap, and in particular of a high-lift flap of an aircraft according to a first and third exemplary embodiment of the invention. The device serves to influence the flap vortex and in particular to reduce the aerodynamically induced noise at the lateral edge 12; 32 of a control flap 11; 31 and in particular of a high-lift flap of an aircraft. In a prescribed flight direction F of the aircraft, air flows towards the control flap in a flow direction S. At the lateral margin or lateral edge 12; 32 of the control flap 11; 31, i.e. at the lateral joining edge between a front and rear edge of the flap when viewed in the flow direction of the air, there is provided a device which influences the flap vortex or a vortex generator with elements extending transversely to or at an angle to the flow direction of the air or in the wing span direction, between which air flowing past the control flap 11; 31, i.e. some of air the flowing towards the flap, flows.

It is common to both exemplary embodiments that the elements extending transversely to the flow direction or in the wing span direction are configured as surface portions 13; 31, 33 of the control flap 11; 31 which form one or more air passages located between these surface portions, through which the air flowing towards the control flap 11; 31 flows.

In the first exemplary embodiment shown in FIG. 1, the flap portions 13 extending transversely to the flow direction or in the wing span direction of the flap 11, 31 are disposed rigidly or fixedly on the control surface 11. The flap portions are configured in such a manner that at least one air passage or a plurality of air passages forms or form between these flap portions 13 when viewed in the flow direction of the air when flow takes place towards the flap as intended. As a result, when flow takes place towards the flap as intended some of the air flowing towards the control flap 11 flows through the air passages. In this embodiment of the invention, the flap portions or surface portions 13 extending transversely to the flow direction or in the wing span direction are in particular configured as finger-like, extending from an end connected to the lateral edge 12 of the control flap or flap 11 and projecting outwards so that its second end located opposite to the first end forms a free end. The number of surface portions 13 is between three and nine and preferably between three and five. This is based on the assumption that combining of the individual vortices is avoided or a least reduced by an irregularly configured lateral edge 12. Thus, a number of smaller vortex zones are formed, which emit noise in the high-frequency range which, however, is very rapidly attenuated in the atmosphere.

Figure 7:
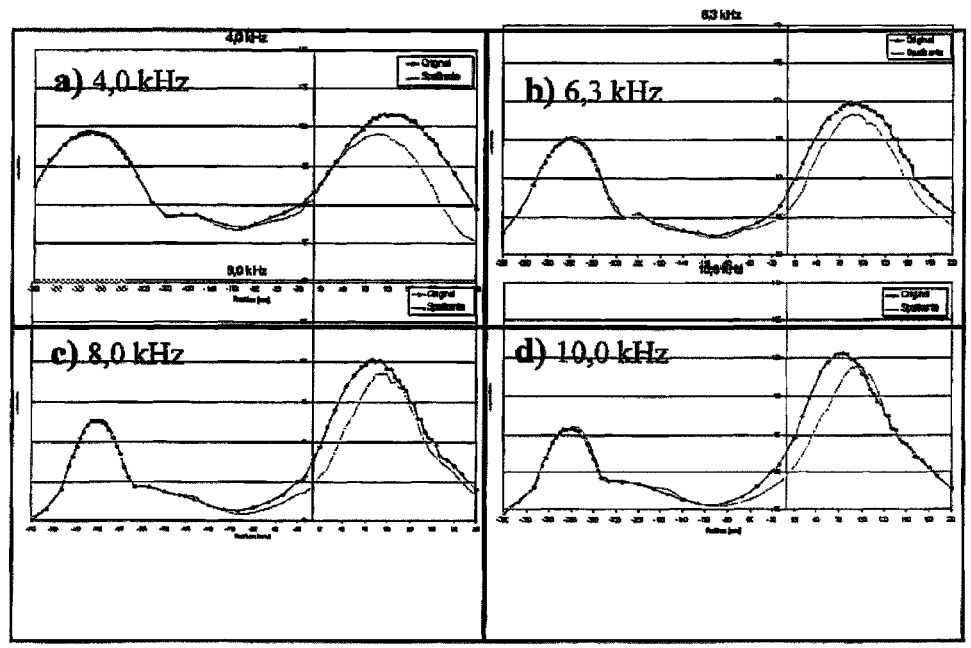

The mode of action of the solutions according to the invention has already been demonstrated in a model experiment in a wind tunnel. The results are plotted in FIG. 7 for four different frequencies as a function of the landing flap position. The thin, lower line reveals a significant reduction in the aerodynamically produced noise compared with a conventional landing flap (thick, upper line).

In the third exemplary embodiment shown in FIG. 3, at least one of the flap portions extending transversely to the flow direction or in the wing span direction is configured as a flap segment or surface segment 33 which is movable with respect to the aerodynamic flap 31. In this case, it can be provided in particular that another flap segment 32 connected fixedly or rigidly to the flap 31 is disposed in front of the at least one movable flap segment 33 on the aerodynamic flap 31 when viewed in the flow direction S. In this case, at least one further flap segment 32 can additionally be disposed behind the movable flap segment 33. Also the further flap segment 32 can be disposed in front of or behind the movable flap segment 33. However, if a plurality of movable flap segments 33 are provided, in each case one of the further flap segments 32 can be but need not be provided. After executing its opening movement or during its opening movement, the movable flap segment 33 exposes an air passage through which flows some of the air flowing towards the flap as intended from the underside of a relatively first region of the flap 31 when viewed in the flow direction of the air towards the upper side of a rear second region of the flap 31 relative to the first region. In this case, the opening movement is a control movement which start from a starting position in which the respectively adjacent edges of the respectively adjacent movable flap segment and of the further flap segment 32 located in front of said flap segment are positioned in such a manner that no air passage is formed, and moves into a position in which the respectively adjacent edges of the flap segments 33, 32 are remote from one another in such a manner that an air passage forms between the front and the movable rear flap segments 32 or 33. This means that during its opening movement, on its upstream side, i.e. the side facing the flow, the flap segment 33 which is movable with respect to the flap or control flap 31 can be folded away downwards relative to the flap 31 or the further flap segment 32, that is towards the overpressure side of the profile of the aerodynamic flap 31 and thereby exposes the air passage through which flows the air flowing from the underside of the flap 31 to its upper side. The air passage forms a nozzle accelerating the air flowing from the underside of the control flap 31 to its upper side. The suction action of this accelerated flow prevents interaction of the lateral edge vortex with the surface of the landing flap 31, thereby preventing the mechanism of noise formation.

In an arrangement of a plurality of movable flap segments and/or a plurality of further flap segments 32 attached rigidly to the flap 31, the respectively rear flap segment 33 is disposed movably with respect to a front flap segment 32.

The flap segment 33 which is movable with respect to the aerodynamic flap 31 extends in the flow direction preferably over 30 to 70% of the magnitude of the profile depth of the flap 31 when viewed in the flow direction. The flap segment 33 can also extend approximately over half +/−20% of the profile depth of the control flap 31, wherein a further flap segment attached rigidly to the flap 31 can be disposed behind the movable flap segment 33, i.e. the movable flap segment 33 is disposed approximately centrally on the flap 31. The movable flap segment 33 can be coupled for movement with the control mechanism of the control flap 31.

Figure 2:
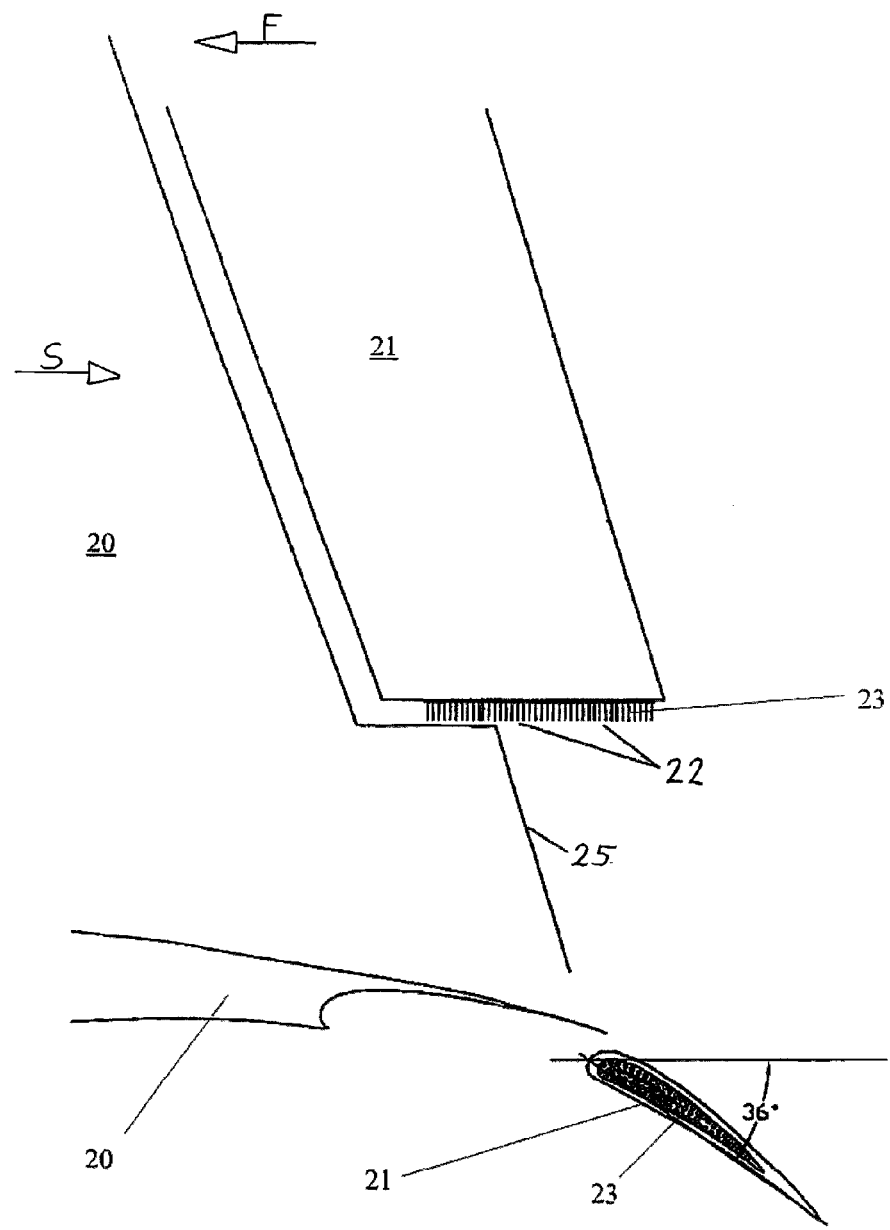
FIG. 2 shows a device for influencing the flap vortex and in particular a device for reducing the aerodynamically induced noise at the lateral edge of a control flap, in particular of a high-lift flap of an aircraft according to a second exemplary embodiment of the invention.

In the second exemplary embodiment shown in FIG. 2, a device which influences the flap vortex is provided on the lateral edge 22 or the margin 22 of the control flap 21, comprising elements extending transversely to the flow direction or in the wing span direction between which air flowing past the control flap 21 flows. The device which influences the flap vortex comprises a large number of elongated elements 23 extending in the wing span direction which form a brush-like arrangement preferably extending substantially over the entire profile depth of the aerodynamic flap 21 or along 75% of the entire lateral edge of the flap 21. The elongated elements 23 of the brush-like arrangement extend transversely to the flow direction of the air or project substantially at right angles from the lateral edge 22 of the control flap 21. The brush-like arrangement 23 has an outline which is matched to the profile of the control flap 21, i.e. so that the outline runs approximately parallel to the profile of the lateral edge of the flap 21. As in the two previously described exemplary embodiments, the operating mode of this brush-like arrangement is likewise based on a fragmentation of the large vortex into many smaller one which presumably partly cancel each other out.

Figure 6:
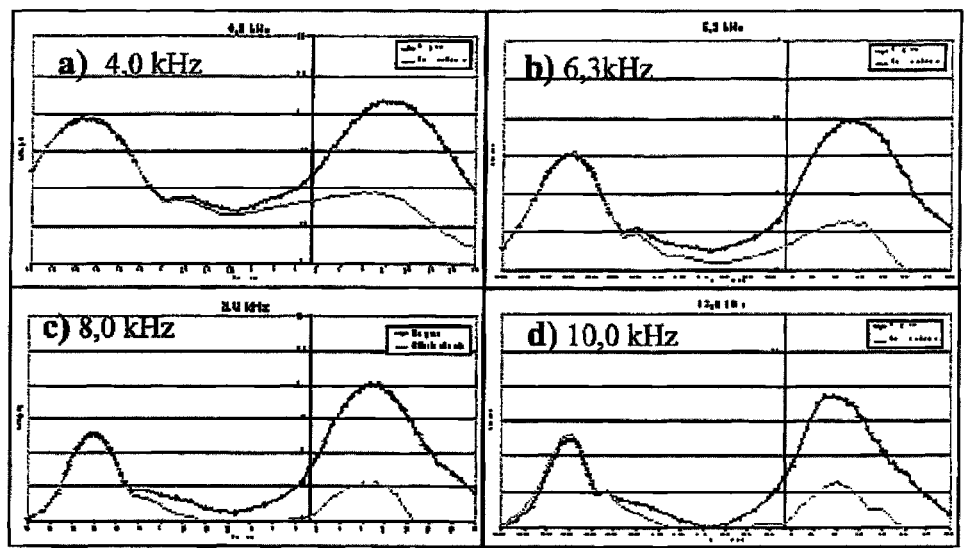
FIGS. 6 and 7 are diagrams showing the reduction in the aerodynamically induced noise for two exemplary embodiment of the invention, i.e. the second exemplary embodiment shown in FIG. 2 (FIG. 6) or the first exemplary embodiment shown in FIG. 1 (FIG. 7).

Preliminary results of a wind tunnel experiment with this variant reveal a considerable reduction potential over the entire relevant frequency range. This is shown in FIG. 6 for four different frequencies as a function of the landing flap position. The thin lower line reveals a significant reduction in the aerodynamically generated noise compared with a conventional landing flap (thick, upper line).

Figure 4:
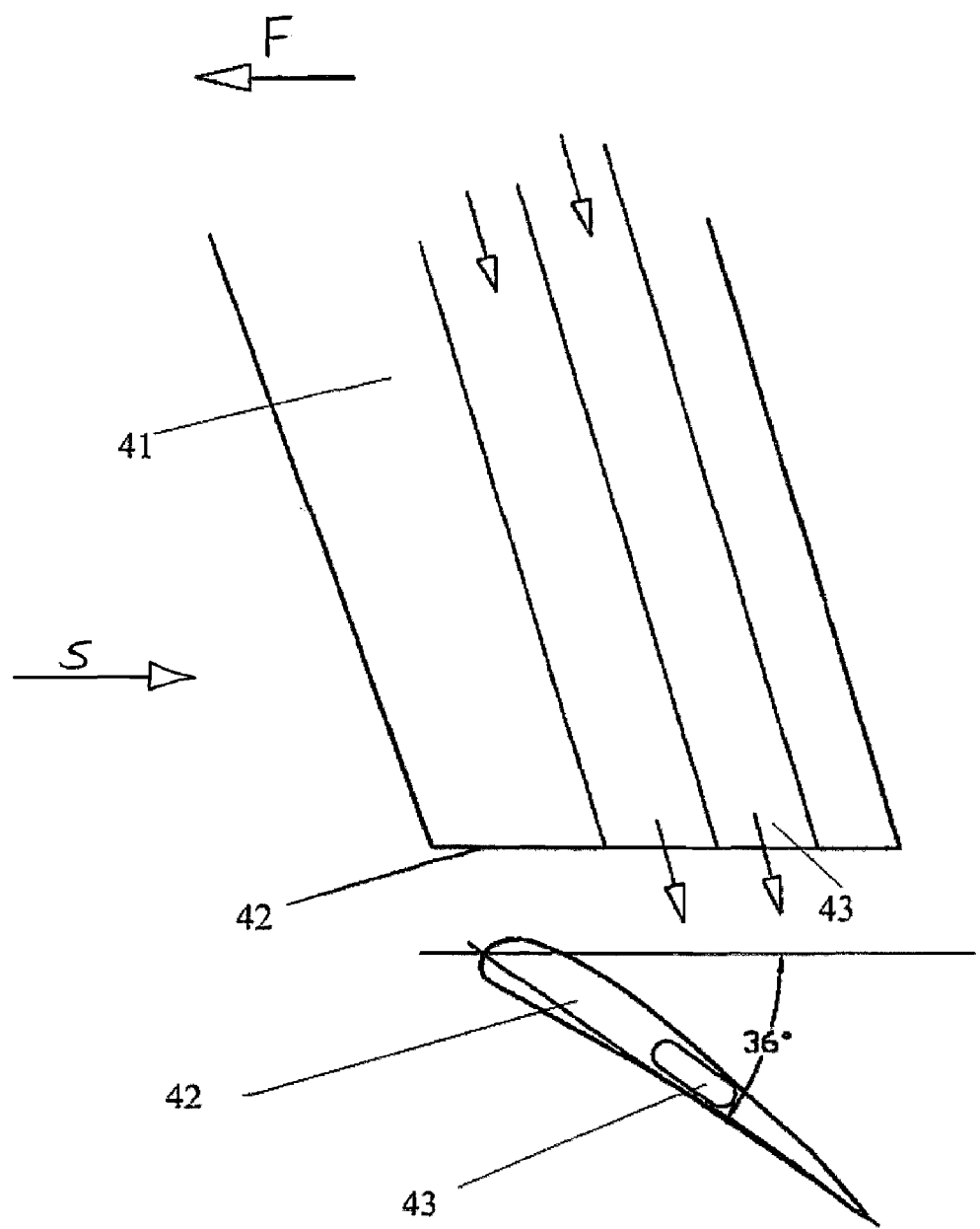
FIG. 4 shows a device for influencing the flap vortex and in particular a device for reducing the aerodynamically induced noise at the lateral edge of a control flap, in particular of a high-lift flap of an aircraft according to a first exemplary embodiment of the invention.
Figure 5:
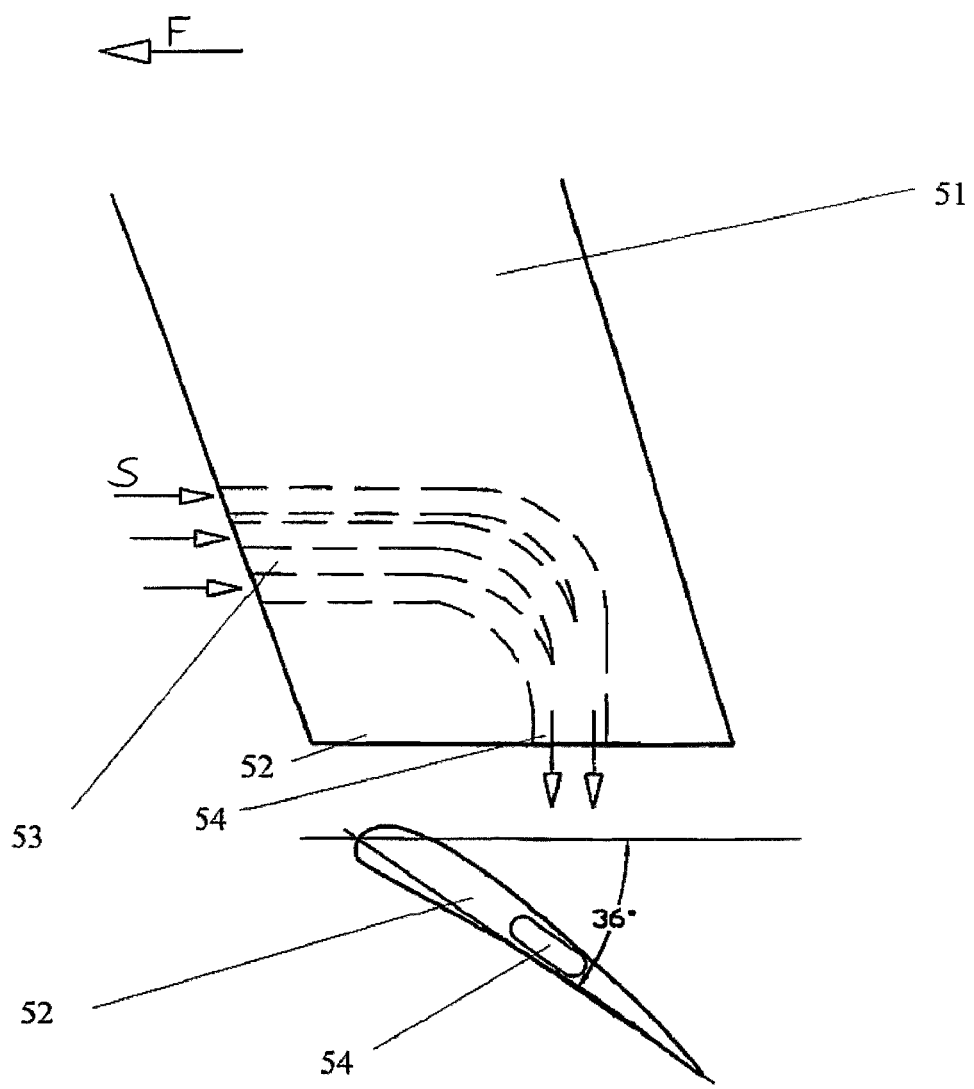
FIG. 5 shows a device for influencing the flap vortex and in particular a device for reducing the aerodynamically induced noise at the lateral edge of a control flap, in particular of a high-lift flap of an aircraft according to a fifth exemplary embodiment of the invention.

FIGS. 4 and 5 show a device for influencing the flap vortex or for reducing the aerodynamically induced noise at the lateral edge of a control flap, in particular of a high-lift flap of an aircraft according to a fourth and a fifth exemplary embodiment of the invention. A device which influences the flap vortex which reduces the aerodynamically induced noise is provided at the lateral edge 42; 52 of a landing flap 41; 51, in particular of a high-lift flap of an aircraft, said device comprising at least one channel 43; 54 discharging at the lateral edge 42; 52 of the control flap 41; 51 through which compressed air generated by an aircraft system or the flow can be blown into the noise-generating vortex. The channel 43; 54 discharges transversely to the flow direction of the air or substantially perpendicularly to the lateral edge 42; 52 in the profile surface of the control flap 41; 51.

In the fourth exemplary embodiment of the invention shown in FIG. 4, the compressed air blown through the channels 43 discharging at the lateral edge 42 of the control flap 41 is produced by a bleed-air system of the aircraft engines.

In the fifth exemplary embodiment of the invention shown in FIG. 5, the compressed air blown through the channels 54 discharging at the lateral edge 52 of the control flap 51 is produced by dynamic pressure. The compressed air produced by dynamic pressure is drawn off by a channel 53 from the front side of the control flap 51 and is guided through a piping system to the lateral edge 52 of the landing flap 51.

Three effects for reducing noise are achieved by the blowing out from the lateral and/or upper surface of the landing flap 41; 51; on the one hand the lateral edge vortex can be flushed away from the landing flap and thus the mechanism of interaction for noise formation can be prevented, on the other hand, it is possible to reduce the vortex strength by injection of air into the vortex core to such an extent that no significant emission of sound occurs. The third effect is based on the effect that the air jets emanating from the lateral surface 42; 52, in the same way as the brush edge 22 of the exemplary embodiment shown in FIG. 2, lead to the formation of smaller vortex zones.

The solutions explained previously are not understood exclusively as possibilities for noise reduction but are also aimed at increasing the lift. As a consequence of this, the landing speed of passenger aircraft could be reduced which would not only have a positive effect on noise development. The flight stability can also be improved by the solutions according to the invention.

What is claimed is:

1. An aerodynamic flap of an aircraft, comprising:
a device which influences the flap vortex on at least one lateral edge of the aerodynamic flap which comprises elements extending transversely to the direction of flow of the air along which the air flowing around the aerodynamic flap flows,
wherein the elements extending transversely to the direction of flow of the air are flap portions configured on the lateral edge of the aerodynamic flap which are configured in such a manner that one or more air passages are configured between these flap portions for the through-flow of air flowing onto the aerodynamic flap wherein the flap portions extending transversely to the flow direction of the air comprise at least one flap segment which is movable with respect to the aerodynamic flap, wherein the flap segment is movable in such a manner that during a corresponding movement, it exposes at least one air passage through which the air flowing onto the aerodynamic flap can flow from the underside to the upper side of the aerodynamic flap.

2. The aerodynamic flap according to claim 1, wherein during its movement, the flap segment which is movable with respect to the aerodynamic flap can be folded pivoted away from the aerodynamic flap on its upstream side and thereby exposes an air passage for the through-flow of air flowing from the underside of the aerodynamic flap to its upper side.

3. The aerodynamic flap according to claim 2, wherein the air passage forms a nozzle which accelerates air flowing from the underside of the aerodynamic flap to its upper side.

4. The aerodynamic flap according to claim 1, wherein the length of the flap segment which is movable with respect to the aerodynamic flap when viewed in the direction of flow of the air is between 30% and 70% of the length of the lateral edge of the aerodynamic flap.

5. The aerodynamic flap according to claim 4 wherein the length of the flap segment which is movable with respect to the aerodynamic flap when viewed in the direction of flow of the air is between 30% and 70% of the profile depth of the aerodynamic flap.

6. The aerodynamic flap according to claim 1, wherein a coupling mechanism is provided for coupling the control mechanism of the aerodynamic flap to the control mechanism of the movable flap segment for coupling the movement of the movable flap segment with the movement of the aerodynamic flap.

7. A high-lift flap of an aircraft comprising:
a device which influences a flap vortex on at least one lateral edge of the aerodynamic flap wherein the device which influences the flap vortex comprises:
at least one device for supplying compressed air; and
at least one channel which discharges at the lateral edge of the aerodynamic flap and is in communication with the at least one device for supplying compressed air, for expelling compressed air into the surrounding of the aerodynamic flap,
wherein the compressed air blown through the discharging channel at the lateral edge of the aerodynamic flap is produced by dynamic pressure.

8. The high-lift flap of an aircraft according to claim 7, wherein the discharging channel discharges in the profile surface of the lateral edge.

9. The high-lift flap of an aircraft according to claim 7, wherein the discharging channel discharges at an angle between 70 and 110 degrees to the contour line of the lateral edge.

10. The high-lift flap of an aircraft according to claim 7, wherein the discharging channel comprises a connection to the coupling of the aircraft system so that the compressed air expelled through the discharging channel can be supplied from a bleed-air system of the aircraft engines.

11. The high-lift flap of an aircraft according to claim 7, wherein the device which influences the flap vortex comprises at least one channel which discharges into a region of the aerodynamic flap facing the flow and a channel which is in communication with the inlet channel and discharges on the lateral edge of the aerodynamic flap for the through-flow of air from the aerodynamic flap.

12. A device for influencing the flap vortex of a high-lift flap of an aircraft,
 wherein the device influencing the flap vortex for expelling compressed air into the surroundings of the aerodynamic flap comprises:
  at least one device for supplying compressed air,
  at least one discharging channel for expelling compressed air into the surroundings of the aerodynamic flap which can be attached to the lateral edge of the aerodynamic flap, and
  a connecting part for connecting the device for supplying compressed air with the discharging channel,
 wherein the compressed air blown through the discharging channel at the lateral edge of the aerodynamic flap is produced by dynamic pressure.

13. The device according to claim 12, wherein the discharging channel is configured in such a manner that this can be disposed in an aerodynamic flap in such a manner that this discharges in the profile surface of the lateral edge.

14. The device according to claim 12, wherein the discharging channel is configured in such a manner that this can be disposed in an aerodynamic flap in such a manner that it discharges at an angle between 70 and 110 degrees to the contour line of the lateral edge at the discharge point.

15. The device according to claim 12, wherein the discharging channel comprises a connection to the coupling of the aircraft system so that the compressed air expelled through the discharging channel can be supplied from a bleed-air system of the aircraft engines.

16. The device according to claim 12, wherein the device comprises a compressed air supply device through which the compressed air is supplied which can be blown through the channel discharging at the lateral edge of the aerodynamic flap.

17. The device according to claim 16, wherein the device influencing the flap vortex comprises:
  at least one first discharging channel which can be disposed in a region of the aerodynamic flap facing the flow, and
  a further discharging channel which is in communication with a inlet channel and can be attached to the lateral edge of the aerodynamic flap for the through-flow of air flowing from the aerodynamic flap.

* * * * *